United States Patent [19]

Rainer et al.

[11] Patent Number: 4,637,408

[45] Date of Patent: Jan. 20, 1987

[54] FILTER MATERIAL FOR THE REMOVAL OF NITRIC OXIDE

[75] Inventors: Norman B. Rainer, Richmond; Charles S. McClung, Prince George, both of Va.

[73] Assignee: Philip Morris Incorporated, New York, N.Y.

[21] Appl. No.: 526,365

[22] Filed: Aug. 25, 1983

[51] Int. Cl.$^4$ .......................... A24D 3/06; B01D 46/02
[52] U.S. Cl. ..................................... 131/331; 131/334; 131/342; 55/68; 55/387
[58] Field of Search ............... 131/331, 334, 336, 342; 55/68, 387

[56] References Cited

U.S. PATENT DOCUMENTS 3,434,479 3/1969 Till et al. ............................. 131/331
3,957,059 5/1976 Rainer et al. ...................... 131/331

Primary Examiner—V. Millin

[57] ABSTRACT

A composition for removal of NO from smoke, effective after storage in the presence of moisture and the volatile components of tobacco, comprising, by weight of the total composition, from about 5% to about 40% of a permanganate selected from the group consisting of $NaMnO_4$, $Ca(MnO_4)_2$ and mixtures thereof, from about 0.5% to about 6% colloidal silica, from about 40% to about 90% silica gel and from about 4% to about 30% $H_2O$, with the silica gel having a granule size of from about 20 to about 100 mesh and an initial pore volume of from about 0.6 cc/g to about 1.4 cc/g. Alumina gel may be used in place of part of the silica gel in order to reduce the temperature of the smoke.

14 Claims, No Drawings

FILTER MATERIAL FOR THE REMOVAL OF NITRIC OXIDE

BACKGROUND OF THE INVENTION

This invention relates to filter material for the removal of nitric oxide (NO) from smoke. More particularly, this invention relates to filter material containing colloidal silica, silica gel and a permanganate, which is effective in removing NO from tobacco smoke even after prolonged storage in the presence of moisture and the volatile components of tobacco.

Tobacco smoke produced by smoking articles such as cigarettes, pipes and cigars constitutes droplets and particles of materials suspended in a gas phase. The suspended droplets and particles constitute the total particulate matter (TPM) of the smoke. Both the TPM and the gas phase portions of tobacco smoke collectively produce the taste and aroma obtained from smoking a tobacco product.

The TPM can be removed in part from tobacco smoke by filtration devices attached to the smoking article which mechanically intercept and retain the suspended material. A porous rod of crimped fine-denier fibrous material is an example of such a filtration device.

It is preferred to remove some of the components, such as NO, from the gas phase of tobacco smoke. Granular filter materials for the removal of nitrogen oxides from cigarette smoke are disclosed in U.S. Pat. No. 3,434,479, which describes the use of various permanganates, including calcium, magnesium and sodium permanganates, deposited on various substrates, including bauxite, activated alumina, clay, kaolin, and silica gel.

Smoking articles such as cigarettes are packaged in a generally impermeable enclosure to preserve their freshness during the several months which may elapse before they reach the consumer. There is a high content of moisture and volatile organic compounds originating from the tobacco trapped inside the sealed package. Prior to being opened by the consumer, the package may be exposed to temperatures ranging from 30° F. to 120° F. After exposure to moisture, volatile organic compounds, temperature, and the passage of time, many materials which are initially active for smoke filtration lose much of their activity. The filter materials described in U.S. Pat. No. 3,434,479, when freshly prepared, remove a portion of the nitrogen oxides from cigarette smoke, but the activity of the materials diminishes so rapidly with aging and with exposure to moisture that they are impractical for commercial application.

Granular filter materials which remain effective after storage for the removal of nitrogen oxides are disclosed in U.S. Pat. No. 3,957,059, which describes activated alumina impregnated with $NaMnO_4$ and a basic sodium compound, and which discloses that it is critical that the filter material contain less than 6% silica. Removal of 30% to 80% of the nitrogen oxides content of cigarette smoke after prolonged storage is disclosed.

SUMMARY OF THE INVENTION

The present invention relates to a composition effective for the removal of NO from smoke even after storage in the presence of moisture and the volatile components of tobacco. The composition comprises, by weight of the total composition, from about 5% to about 40% of a permanganate selected from the group consisting of sodium permanganate ($NaMnO_4$), calcium permanganate ($Ca(MnO_4)_2$) and mixtures thereof, from about 0.5% to about 6% colloidal silica, from about 40% to about 90% silica gel and from about 4% to about 30% $H_2O$, with the silica gel having a granule size of from about 20 to about 100 mesh and an initial pore volume of from about 0.6 cc/g to about 1.4 cc/g. A preferred composition comprises from about 10% to about 30% $NaMnO_4$, from about 1% to about 5% fumed colloidal silica, from about 50% to about 85% silica gel and from about 5% to about 25% $H_2O$, with the fumed colloidal silica having an average particle size of from $0.007\mu$ to $0.01\mu$ and a surface area of from about 390 $m^2/g$ to about 450 $m^2/g$, and with the silica gel having a granule size of from about 30 to about 80 mesh and an initial pore volume of from 0.9 cc/g to 1.3 cc/g. Alumina gel may be used in place of part of the silica gel in order to reduce the temperature of the smoke.

DESCRIPTION OF THE INVENTION

According to the present invention, a composition is provided which is effective for NO filtration even after prolonged storage. The composition comprises colloidal silica, silica gel, $H_2O$ and a compound selected from the group consisting of $NaMnO_4$, $Ca(MnO_4)_2$ and mixtures thereof.

The silica gel is present in the composition in an amount of from about 40% to about 90%, and preferably from about 50% to about 85%, by weight of the total composition. The silica gel has a granule size of from about 20 to about 100 mesh and a pore volume before combination with the other components (hereinafter "initial pore volume") of from about 0.6 cc/g to about 1.4 cc/g. Preferably, the silica gel has a granule size of from about 30 to about 80 mesh and an initial pore volume of from 0.9 cc/g to 1.3 cc/g. The granule size and pore volume of the silica gel are critical.

Alumina gel may be used in place of part of the silica gel in order to reduce the heat of the smoke, as alumina absorbs more heat than silica. The alumina gel may comprise up to about 30% by weight of the total composition and should have a granule size of from about 20 to about 100 mesh and an initial pore volume of from about 0.3 cc/g to about 1.3 cc/g. Preferably, the alumina gel comprises up to about 20%, and has a granule size of from about 30 to about 60 mesh and an initial pore volume of about 0.5 cc/g.

The permanganate is selected from the group consisting of $NaMnO_4$, $Ca(MnO_4)_2$ and mixtures thereof. The use of one or both of these permanganates is critical; potassium permanganate and magnesium permanganate have been tested and do not provide effective NO filtration after storage. The permanganate is present in the composition in an amount of from about 5% to about 40%, by weight of the total composition. The preferred permanganate is $NaMnO_4$, which is preferably employed in an amount of from about 10% to about 30%.

The colloidal silica is present in the composition in an amount of from about 0.5% to about 6%, by weight of the total composition, and may be either fumed or aqueous. Fumed colloidal silica is prepared by contacting silicon tetrachloride ($SiCl_4$) gas with moisture causing the $SiCl_4$ to precipitate into a cloud of fine $SiO_2$ particles. Aqueous colloidal silica, a standard commercial product, is a clear liquid comprising approximately 35% by weight of silica particles suspended in H₂O. The colloidal silica is preferably fumed colloidal silica, which preferably has an average particle size of from about $0.004\mu$ to about $0.1\mu$ and a surface area of from about 500 m²/g to about 200 m²/g. More preferably, the fumed colloidal silica has an average particle size of from $0.007\mu$ to $0.01\mu$ and a surface area of from about 390 m²/g to about 450 m²/g.

The composition contains from about 4% to about 30% $H_2O$, and more preferably from about 5% to about 25% $H_2O$, by weight of the total composition.

The compositions of the present invention are readily prepared as follows. An aqueous solution is first prepared containing, by weight of the total solution, from about 15% to about 28% permanganate and from about 1% to about 3% colloidal silica. The permanganate is added in powdered or any other form which is readily dissolved in water. In a preferred method of preparing this solution, the permanganate is added to the distilled water first and this mixture is filtered through a fritted glass funnel prior to addition of the colloidal silica. Preferably, the solution contains about 18% permanganate and about 2% colloidal silica.

Next, the silica gel is slowly added, while stirring, to an amount of the solution which is greater than that required for saturation of the silica gel. The mixture is then allowed to stand for approximately 30 minutes before the excess solution is decanted. In a preferred embodiment, the mixture is degassed in a vacuum chamber to enhance penetration of the porous silica gel granules by the solution. The wet granules are then dried to a moisture content of about 4% to about 30% $H_2O$. The drying may be accomplished by placing the wet granules in a 35° C. vacuum oven for about 24 hours, or by passing dry nitrogen through the wet granules at 35° C. In the final composition the permanganate is incorporated within the matrix defined by the silica gel.

The filter material of the invention may be used in cigarettes and other smoking articles to remove NO from tobacco smoke, and may be used in any other device for the filtration of NO.

In a preferred embodiment, the filter material is loaded into plug-space-plug cigarette filters. In testing cigarettes of this type for percent NO removal, it was found that the addition of colloidal silica resulted in an unexpected increase in storage stability of the silica gel and permanganate filter material. After eight weeks of storage within sealed cigarette packages, the filter material was shown to remove from about 44% to 52% of the NO passing through it.

The following examples present illustrative but non-limiting embodiments of the present invention. Comparative examples are also presented.

EXAMPLES

The silica gel used in the following examples was Grade 59 (Davison Chemical Division, Baltimore, Md.) having a pore volume of 1.15 cc/g. The alumina gel was Grade H51 (Aluminum Co. of America, Pittsburgh, Pa.), having a pore volume of 0.5 cc/g. The colloidal silica was Cabosil EH-5 (Cabot Corporation, Boston, Mass.), an amorphous fumed colloidal silica having an average particle size of $0.007\mu$ and a surface area of 390 m²/g. The $NaMnO_4$ (Carus Chemical Co., La Salle, Ill.) and the $Ca(MnO_4)_2$ (Atomergic Chemetals Corp., Plainview, N.Y.) were in powdered form and of 95% purity.

The filter configuration of the cigarettes used in the examples below was plug-space-plug, having a space 8 to 9 mm in diameter and 4 to 15 mm in length, and having taped dilution holes. The space was filled to at least 60% capacity with from 50 to 200 mg of granular filter material. The tobacco rod was 60 mm in length and contained a conventional blend of fillers. The resistance to draw (RTD) of the cigarette was in the range of 5 to 6 inches of $H_2O$.

A puff-by-puff procedure was used in the examples below to determine the percent NO removal from smoke passing through the cigarette filter. Five cigarettes were utilized for each determination. These cigarettes were smoked simultaneously on a five-port smoking machine using standard specifications, that is, a 35 ml puff of 2 second puff duration taken every 60 seconds. The environmental smoking conditions of temperature and relative humidity (R.H.) were maintained at 75° F.±1° and 60% R.H. ±2%. A monitor cigarette was used to insure that the air draft, puff count and TPM were within the standard operating range. Each port was equipped with a standard Cambridge filter pad of $0.3\mu$ pore size. The gas phase smoke which exited from the five ports, 175 ml in total volume, was mixed in a manifold system. One aliquot of smoke was drawn under vacuum through an Oxides of Nitrogen Analyzer, model 1600, made by Columbia Scientific Industries of Austin, Tex., which monitored the chemiluminescence reaction produced by the reaction of NO with ozone ($O_3$). The NO delivery was quantitated by comparison to an NO peak response of known concentration. The % NO removal was computed according to the formula: $100 \; (NO_{control} - NO_{sample}) \div NO_{control} = \%$ NO removal. For total gas phase delivery of the monitor cigarette, the relative standard deviation of NO at the two-sigma level was ±9%. Two determinations were made for each sample filter material.

Storage of cigarettes in the following examples was effected by placing cigarettes loaded with sample filter material in conventional 20 cigarette packages, sealing the package by conventional methods in a cellophane film which is generally impermeable to moisture and organic vapors, and placing the packages in sealed screw-cap glass jars at the specified temperature and R.H.

Example 1

There was first prepared an aqueous solution of 18% $NaMnO_4$ and 2% fumed colloidal silica, by weight of the total solution. The $NaMnO_4$ was added to distilled water and the mixture filtered through a fritted glass funnel prior to addition of the colloidal silica.

Filter material for samples A and B was obtained by slowly adding, while stirring, approximately 150 g of 30×80 mesh silica gel to a first portion of the solution, the amount of solution being greater than that required for saturation of the silica gel. The mixture was allowed to stand for approximately 30 minutes before the excess solution was decanted. The wet granules were placed in a 35° C. vacuum oven for about 24 hours, resulting in a filter material comprising, by weight of the total composition, 22.2% $NaMnO_4$, 3.3% colloidal silica, 64% silica gel and 10.5% $H_2O$.

The filter material for comparative samples C and D was obtained by adding approximately 150 g of 30×80 mesh alumina gel to a second portion of the solution, and proceeding in the same manner as described for samples A and B. The filter material of samples C and D comprised, by weight of the total composition, 22.9% NaMnO4, 3.5% colloidal silica, 63.8% alumina gel and 9.8% H2O.

Cigarettes were prepared using approximately 175 mg of each sample filter material. The cigarettes were tested for NO filtration during the first week and again after eight weeks of storage at 75° F. and 60% R.H. The results summarized in Table 1 show that the silica gel samples (A and B) exhibited a high degree of NO filtration activity both before and after storage, while this was not true of the alumina gel samples (C and D).

TABLE 1

| Sample | Week | NO$_{mg}$ | % NO Removal | Week | NO$_{mg}$ | % NO Removal |
|---|---|---|---|---|---|---|
| A | 1 | .13 | 48 | 8 | .14 | 44 |
| B | 1 | .13 | 48 | 8 | .12 | 52 |
| C | 1 | .18 | 28 | 8 | .23 | 8 |
| D | 1 | .19 | 24 | 8 | .20 | 20 |

EXAMPLE 2

A comparative sample E containing NaMnO4 and silica gel was prepared as in Example 1 except that the composition did not include colloidal silica. Sample E filter material comprised, by weight of the total composition, 25.1% NaMnO4, 64.7% silica gel and 10.2% H2O. Cigarettes containing sample E filter material were tested for NO filtration during the first week and after ten weeks of storage at 75° F. and 60% R.H.

A comparative sample F containing NaMnO4 and 60×80 mesh alumina gel was prepared as in Example 1 except that colloidal silica was not included in the composition. Sample F filter material comprised, by weight of the total composition, 25.8% NaMnO4, 63.8% alumina gel and 10.4% H2O. Cigarettes containing sample F filter material were tested for NO filtration during the first week and after ten weeks of storage at 75° F. and 60% R.H.

The results summarized in Table 2 show that while the silica gel filter material (E) was initially highly effective in removing NO from the smoke, its effectiveness dropped off after storage. The alumina-containing sample F was never particularly effective, and also dropped off after storage. In contrast, samples A and B filter material (Example 1) containing NaMnO4, colloidal silica, silica gel and H2O, maintained their effective NO filtration activity after eight weeks of storage.

TABLE 2

| Sample | Week | NO$_{mg}$ | % NO Removal | Week | NO$_{mg}$ | % NO Removal |
|---|---|---|---|---|---|---|
| E | 1 | .12 | 50 | 10 | .15 | 38 |
| F | 1 | .21 | 16 | 10 | .22 | 12 |

EXAMPLE 3

Approximately 2.7 g of fumed colloidal silica was blended with 40.0 g of a saturated aqueous solution of NaMnO4 to form a malleable cake. The cake was dried in a 30° C. vacuum oven until it was hard and brittle, and then ground and sieved to 30×80 mesh to obtain comparative sample G filter material. Under magnification, the filter material was shown to have a fragile structure. Sample G filter material comprised, by weight of the total composition, 73.4% NaMnO4, 19.8% colloidal silica and 6.8% H2O. Cigarettes containing this filter material were tested for NO filtration during the first week and after six weeks of storage at 75° F. and 60% R.H. The results summarized in Table 3 below show that a mixture of colloidal silica, NaMnO4 and H2O, without silica gel, did not provide an effective NO filter material.

TABLE 3

| Sample | Week | NO$_{mg}$ | % NO Removal | Week | NO$_{mg}$ | % NO Removal |
|---|---|---|---|---|---|---|
| G | 1 | .18 | 28 | 6 | .18 | 28 |

EXAMPLE 4

Three filter materials containing a permanganate, colloidal silica, silica gel and H2O, were prepared as in Example 1. Sample H comprised, by weight of the total composition, 22% Ca(MnO4)2, 2.6% colloidal silica, 66.7% silica gel and 8.7% H2O. Sample I comprised 10% KMnO4, 5.7% colloidal silica, 78.1% silica gel and 6.2% H2O. Comparative sample J comprised 26% Mg(MnO4)2, 1.9% colloidal silica, 63.6% silica gel and 8.5% H2O.

Cigarettes of each sample filter material were prepared with approximately 175 mg of filter material. The cigarettes were tested for NO filtration during the first week and after nine weeks of storage at 75° F. and 60% R.H. The results summarized in Table 4 show that the Ca(MnO4)2, colloidal silica, silica gel and H2O filter material (H) maintained its effective NO filtration activity after storage, but this was not true for the KMnO4 and Mg(MnO4)2 filter materials (I and J).

TABLE 4

| Sample | Week | NO$_{mg}$ | % NO Removal | Week | NO$_{mg}$ | % NO Removal |
|---|---|---|---|---|---|---|
| H | 1 | .16 | 33 | 9 | .14 | 42 |
| I | 1 | .22 | 8 | 9 | .24 | 0 |
| J | 1 | .22 | 8 | 9 | .20 | 17 |

EXAMPLE 5

Approximately 20 g of 60×80 mesh silica gel was vacuum impregnated with an aqueous solution of 18% by weight Ca(MnO4)2 to make comparative sample K filter material, comprising, by weight of the total composition, 36.0% Ca(MnO4)2, 56.4% silica gel and 7.6% H2O. Approximately 20 g of 40×60 mesh silica gel was vacuum impregnated with an aqueous solution of 18% by weight Ca(MnO4)2 to make comparative sample L filter material, comprising, by weight of the total composition, 35.2% Ca(MnO4)2, 57.3% silica gel and 7.5% H2O. Cigarettes containing the sample filter materials were tested for NO filtration during the first week and after six weeks of storage at 90° F. and 85% R.H. The results summarized in Table 5 show that while both filter materials were initially effective in removing NO from smoke, their effectiveness dropped off after storage. In contrast, sample H filter material (Example 4) containing Ca(MnO4)2, colloidal silica, silica gel and H2O, maintained its effective NO filtration activity after nine weeks of storage.

TABLE 5

| Sample | Week | NO$_{mg}$ | % NO Removal | Week | NO$_{mg}$ | % NO Removal |
|---|---|---|---|---|---|---|
| K | 1 | .16 | 36 | 6 | .24 | 4 |
| L | 1 | .14 | 44 | 6 | .26 | 0 |

We claim:

1. A composition for NO filtration, comprising, by weight of the total composition, from about 5% to about 40% of a permanganate selected from the group consisting of $NaMnO_4$, $Ca(MnO_4)_2$ and mixtures thereof, from about 0.5% to about 6% colloidal silica, from about 40% to about 90% silica gel and from about 4% to about 30% $H_2O$, said silica gel having a granule size of from about 20 to about 100 mesh and an initial pore volume of from about 0.6 cc/g to about 1.4 cc/g.

2. The composition of claim 1 wherein the permanganate is incorporated within a matrix defined by the silica gel.

3. The composition of claim 1 wherein the permanganate is $NaMnO_4$.

4. The composition of claim 1 including up to about 30% alumina gel having a granule size of from about 20 to about 100 mesh and an initial pore volume of from about 0.3 cc/g to about 1.3 cc/g.

5. A composition for NO filtration, comprising, by weight of the total composition, from about 10% to about 30% $NaMnO_4$, from about 1% to about 5% fumed colloidal silica, from about 50% to about 85% silica gel and from about 5% to about 25% $H_2O$, said silica gel having a granule size of from about 30 to about 80 mesh and an initial pore volume of from 0.9 cc/g to 1.3 cc/g.

6. The composition of claim 5 including up to about 20% alumina gel having a granule size of from about 30 to about 60 mesh and an initial pore volume of about 0.5 cc/g.

7. A cigarette filter for NO filtration, comprising a plug-space-plug filter wherein the space between the plugs contains the composition of claim 1.

8. A cigarette, comprising a tobacco rod and the filter of claim 7.

9. A composition for NO filtration, comprising, by weight of the total composition, from about 5% to about 40% of a permanganate selected from the group consisting of $NaMnO_4$, $Ca(MnO_4)_2$ and mixtures thereof, from about 0.5% to about 6% fumed colloidal silica, from about 40% to about 90% silica gel and from about 4% to about 30% $H_2O$, said colloidal silica having an average particle size of from about $0.004\mu$ to about $0.1\mu$ and a surface area of from about 500 $m^2/g$ to about 200 $m^2/g$, and said silica gel having a granule size of from about 20 to about 100 mesh and an initial pore volume of from about 0.6 cc/g to about 1.4 cc/g.

10. The composition of claim 9 wherein the permanganate is incorporated within a matrix defined by the silica gel.

11. The composition of claim 9 wherein the permanganate is $NaMnO_4$.

12. The composition of claim 9 including up to about 30% alumina gel having a granule size of from about 20 to about 100 mesh and an initial pore volume of from about 0.3 cc/g to about 1.3 cc/g.

13. A composition for NO filtration, comprising, by weight of the total composition, from about 10% to about 30% $NaMnO_4$, from about 1% to about 5% fumed colloidal silica, from about 50% to about 85% silica gel and from about 5% to about 25% $H_2O$, said colloidal silica having an average particle size of from $0.007\mu$ to $0.01\mu$ and a surface area of from about 390 $m^2/g$ to about 450 $m^2/g$, and said silica gel having a granule size of from about 30 to about 80 mesh and an initial pore volume of from 0.9 cc/g to 1.3 cc/g.

14. The composition of claim 13 including up to about 20% alumina gel having a granule size of from about 30 to about 60 mesh and an initial pore volume of about 0.5 cc/g.

* * * * *